(12) United States Patent
Shimizu et al.

(10) Patent No.: US 11,738,701 B2
(45) Date of Patent: Aug. 29, 2023

(54) WIRE HARNESS AND OUTER COVER MEMBER

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Takeshi Shimizu, Yokkaichi (JP); Tomoya Kawaguchi, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 267 days.

(21) Appl. No.: 17/297,182

(22) PCT Filed: Sep. 24, 2019

(86) PCT No.: PCT/JP2019/037387
§ 371 (c)(1),
(2) Date: May 26, 2021

(87) PCT Pub. No.: WO2020/115995
PCT Pub. Date: Jun. 11, 2020

(65) Prior Publication Data
US 2022/0032863 A1    Feb. 3, 2022

(30) Foreign Application Priority Data
Dec. 3, 2018 (JP) .................. 2018-226347

(51) Int. Cl.
H01B 7/18 (2006.01)
H01B 7/40 (2006.01)
(Continued)

(52) U.S. Cl.
CPC ........... *B60R 16/0215* (2013.01); *H01B 7/18* (2013.01); *H01B 7/40* (2013.01); *H01B 7/421* (2013.01); *H01B 11/02* (2013.01); *H02G 3/0462* (2013.01)

(58) Field of Classification Search
CPC ........ B60R 16/0215; H01B 7/18; H01B 7/40; H01B 7/421; H01B 11/02
(Continued)

(56) References Cited

U.S. PATENT DOCUMENTS

| | | | |
|---|---|---|---|
| 6,933,440 B2 * | 8/2005 | Ichikawa | B60R 16/0215 248/68.1 |
| 7,172,042 B2 * | 2/2007 | Yamaguchi | B60R 16/0215 180/68.5 |
| 2008/0156516 A1 | 7/2008 | Watanabe | |
| 2009/0167078 A1 | 7/2009 | Watanabe | |

(Continued)

FOREIGN PATENT DOCUMENTS

| | | |
|---|---|---|
| JP | 2007-80623 A | 3/2007 |
| JP | 2011-173456 A | 9/2011 |

(Continued)

OTHER PUBLICATIONS

Nov. 12, 2019 International Search Report issued in International Patent Application No. PCT/JP2019/037387.

*Primary Examiner* — Timothy J Thompson
*Assistant Examiner* — Michael F McAllister
(74) *Attorney, Agent, or Firm* — Oliff PLC

(57) ABSTRACT

A wire harness including: a wire; and an outer cover into which the wire is inserted; wherein the outer cover is provided with a spring that is in contact with an outer circumferential surface of the wire. An outer cover into (Continued)

which a wire is to be inserted, the outer cover including a spring configured to come into contact with an outer circumferential surface of the wire.

2 Claims, 6 Drawing Sheets

(51) Int. Cl.
*H01B 11/02* (2006.01)
*B60R 16/02* (2006.01)
*H01B 7/42* (2006.01)
*H02G 3/04* (2006.01)

(58) Field of Classification Search
USPC ........................................ 174/72 A
See application file for complete search history.

(56) References Cited

U.S. PATENT DOCUMENTS

| 2012/0111598 | A1* | 5/2012 | Pawluk | H02G 3/0437 |
| | | | | 174/68.3 |
| 2013/0008710 | A1* | 1/2013 | Toyama | B60R 16/0215 |
| | | | | 174/70 C |
| 2014/0008123 | A1* | 1/2014 | Pawluk | H02G 3/0437 |
| | | | | 174/99 R |
| 2016/0365166 | A1* | 12/2016 | Ohkubo | H01B 7/17 |
| 2018/0277284 | A1 | 9/2018 | Huang et al. | |

FOREIGN PATENT DOCUMENTS

| JP | 2015-82467 A | 4/2015 |
| JP | 2016-100062 A | 5/2016 |
| JP | 2018-147663 A | 9/2018 |
| WO | 2006/107050 A1 | 10/2006 |
| WO | 2014/142141 A1 | 9/2014 |

\* cited by examiner

WIRE HARNESS AND OUTER COVER MEMBER

BACKGROUND

The present disclosure relates to a wire harness and an outer cover member.

Conventionally, wire harnesses used in vehicles such as hybrid vehicles or electric vehicles are provided with wires for electrically connecting electrical devices such as high-voltage batteries and high-voltage inverters (for example, see JP 2011-173456A).

A plurality of wires are, for example, respectively inserted into metal pipes in a region of a wire harness for connecting a battery mounted on the rear side and an inverter mounted on an engine room to each other, the region of the wire harness being routed under the floor from the rear side and being drawn into the engine room on the front side.

SUMMARY

Incidentally, as described above, because a high-voltage inverter and a high-voltage battery are used as electrical devices in a vehicle such as a hybrid vehicle or an electric vehicle, there are cases where a large current that is several hundreds of amperes in magnitude flows through a wire, for example. If a large current flows through a wire, there is a concern that heat may be generated by the wire. If the wire is inserted into an outer cover member such as a metal pipe, it is expected that the heat will be dissipated from the metal pipe. However, the thermal resistance between the wire and the metal pipe will be a bottleneck for heat dissipation.

An exemplary aspect of the disclosure provides a wire harness and an outer cover member by which heat dissipation can be improved.

A wire harness according to an exemplary aspect includes a wire, and an outer cover into which the wire is inserted, in which the outer cover is provided with a spring that is in contact with an outer circumferential surface of the wire.

According to this configuration, the outer cover is provided with the spring that is in contact with the outer circumferential surface of the wire, and thus the thermal resistance decreases as the contact area increases, and heat dissipation can be improved.

It is preferable that an insulation covering an outer circumference of a core wire of the wire is interposed between the wire and the spring in the wire harness.

According to this configuration, because the insulation covering the outer circumference of the core wire of the wire is interposed between the wire and the spring, it is possible to ensure the insulating properties of the wire harness.

It is preferable that, in the wire harness, the insulation is an insulating sheath that has a gap between the core wire and the insulating sheath and that covers an outer circumference of the core wire, and the spring has elasticity to follow expansion and contraction of the core wire and eliminate the gap between the core wire and the insulating sheath.

According to this configuration, a loose insulating sheath is applied such that the core wire can expand and contract, and the gap between the core wire and the insulating sheath is eliminated by the spring, and thus, the extra length absorbing capability that the wire originally has can be exerted while improving heat dissipation.

It is preferable that, in the wire harness, the insulation is an insulating coating provided on an inner surface of the spring, the wire is an uncovered wire that does not have an insulating sheath on the outer circumference of the core wire, and the spring has elasticity to follow expansion and contraction of the core wire and cover the entire outer circumference of the core wire with the insulating coating.

According to this configuration, because the uncovered wire is used, the core wire has high elasticity, and thus the extra length absorbing capability that the wire originally has can be suitably exerted.

It is preferable that the wire harness is provided with a heat dissipater that fills a gap between the spring and the outer cover.

According to this configuration, because the heat dissipater that fills the gap between the spring and the outer cover is provided, heat is readily released from the spring to the outer cover, and heat dissipation can be more suitably improved.

An outer cover for resolving the above-described issues is an outer cover into which a wire is to be inserted, and the outer cover is provided with a spring configured to come into contact with an outer circumferential surface of the wire.

According to this configuration, the spring that is in contact with the outer circumferential surface of the wire is provided, and thus the thermal resistance decreases as the contact area increases, and heat dissipation can be improved.

According to a wire harness and an outer cover of the present disclosure, heat dissipation can be improved.

DETAILED DESCRIPTION OF EMBODIMENTS

Figure 1:
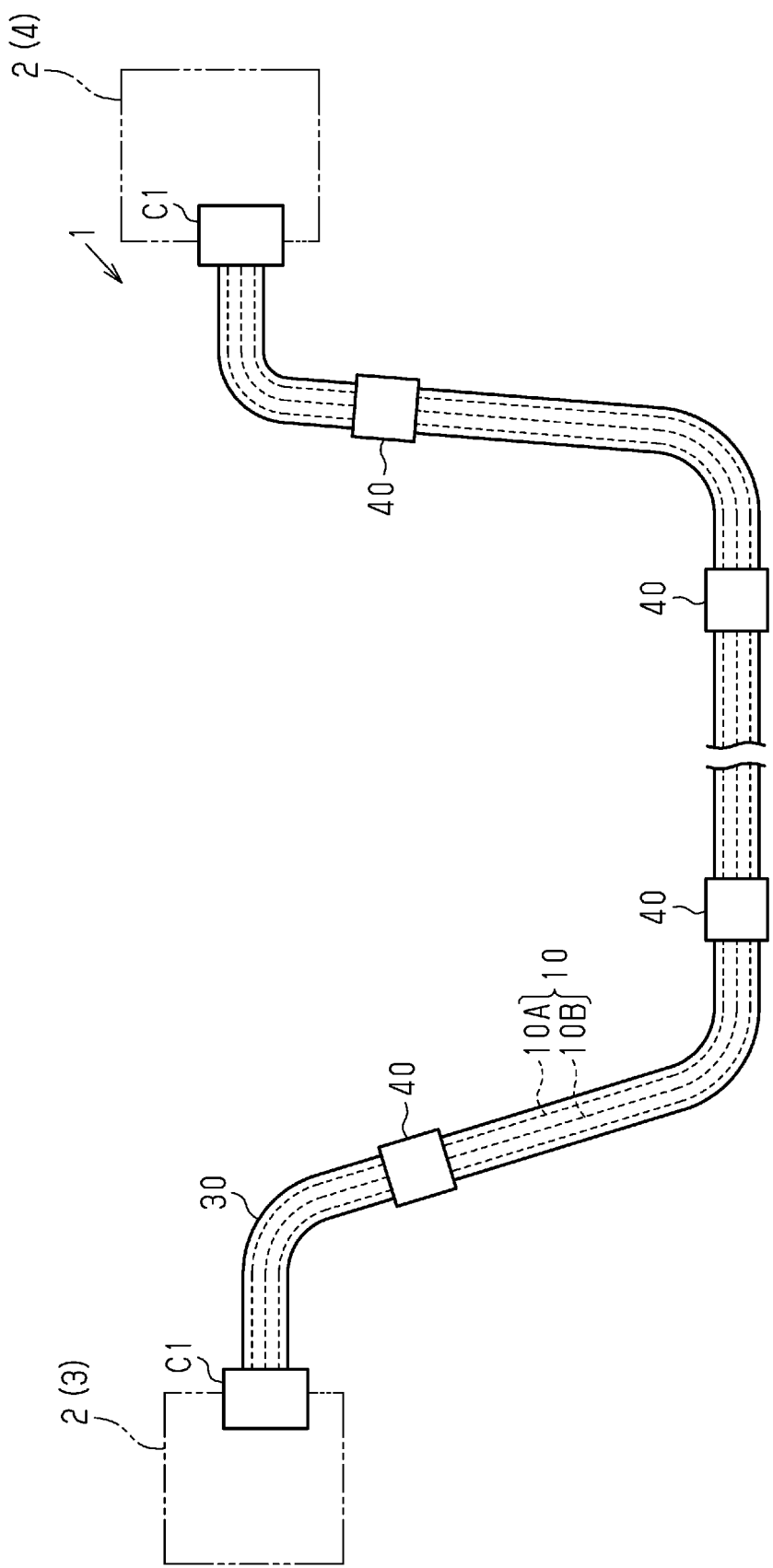
FIG. 1 is a schematic configuration diagram showing a wire harness according to one embodiment.

The following describes one embodiment of a wire harness and an outer cover member with reference to the drawings. Note that, in the drawings, some of the components may be exaggerated or simplified for the sake of description. Also, the dimensional ratio of some parts may differ from their actual ratio.

As shown in FIG. 1, a wire harness 1 electrically connects two electric apparatuses (devices) 2, or three or more electric apparatuses (devices) 2. The wire harness 1 according to this embodiment electrically connects an inverter 3 disposed in a front part of a vehicle, such as a hybrid vehicle or an electric vehicle, and a high-voltage battery 4 installed in a part of the vehicle rearward of the inverter 3, for example. The wire harness 1 is routed under the floor of the vehicle, for example. The inverter 3 is connected to a wheel driving motor (not shown), which is a power source for driving the vehicle. The inverter 3 generates AC power from DC power that is supplied from the high-voltage battery 4, and supplies the AC power to the motor. The high-voltage battery 4 is a battery that can supply a voltage of several hundred volts, for example.

The wire harness 1 includes a plurality (two in the example shown in FIG. 1) of conductive paths 10, a pair of connectors C1 respectively attached to two end portions of the conductive paths 10, a protective tube 30 collectively enclosing the plurality of conductive paths 10, and a plurality (four shown in FIG. 1) of clamps 40. Each conductive path 10 is elongated to extend in the front-back direction of the vehicle. The conductive paths 10 are high-voltage wires that can handle high voltages and large currents, for example. Also, the conductive paths 10 are non-shielded wires that have no shielding structure, for example. The conductive path 10 of this example includes two non-shielded high-voltage wires, namely, a positive-side conductive path 10A connected to the positive terminal of the high-voltage battery 4, and a negative-side conductive path 10B connected to the negative terminal of the high-voltage battery 4. One end portion of the conductive paths 10A and 10B is connected to the inverter 3 via one of the connectors C1, and the other end portion of the conductive paths 10A and 10B is connected to the high-voltage battery 4 via the other connector C1.

The protective tube 30 is composed of a metallic material such as an iron-based material or an aluminum-based material, for example. The protective tube 30 functions to protect the conductive paths 10A and 10B inserted therein from flying objects, water droplets, and the like, to collectively shield the conductive paths 10A and 10B, and also to dissipate heat generated by the conductive paths 10A and 10B, and the like. The conductive paths 10A and 10B correspond to one example of the wire member, and the protective tube 30 corresponds to one example of the outer cover member (outer cover). The protective tube 30 in which the plurality of conductive paths 10 are housed is fixed to a vehicle body or the like by the clamps 40.

Figure 2:
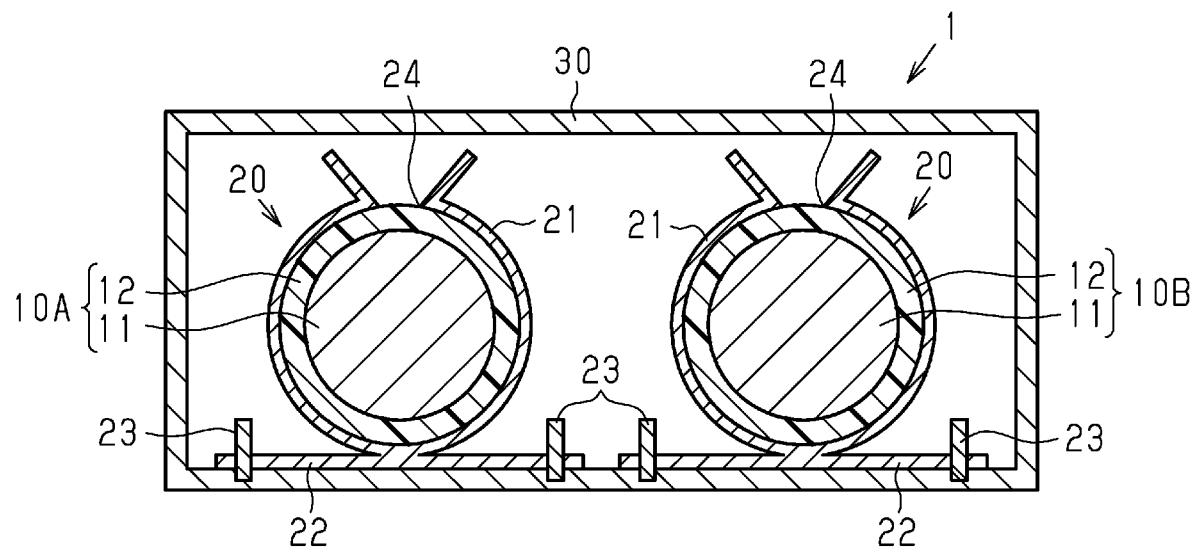
FIG. 2 is a cross-sectional view of a wire harness according to one embodiment.
Figure 3:
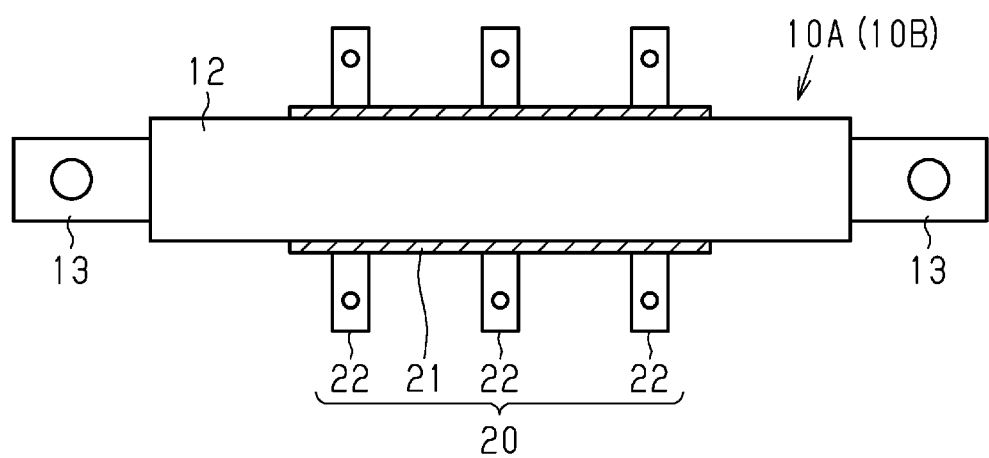
FIG. 3 is a partial cross-sectional view of a wire harness according to one embodiment, showing a state in which a conductive path is introduced into a spring member.

As shown in FIGS. 2 and 3, the conductive paths 10A and 10B of this example each have a core wire 11 and an insulating sheath 12 covering an outer circumference of the core wire 11. A twisted wire obtained by twisting a plurality of bare metal wires together, a soft conductor (a flexible conductor) such as a braided conductor in which a plurality of bare metal wires are braided into a tubular shape, a single core wire constituted by one columnar (e.g., round columnar) metal rod whose inside is solid, or a tubular conductor (a pipe conductor) whose inside is hollow can be used for the core wire 11, for example. Also, a twisted wire, a columnar conductor, and a tubular conductor may be combined as the core wire 11. The core wire 11 of this example is composed of a twisted wire, which is one example of a soft conductor. It is possible to use a highly conductive metal such as a copper-based metal or an aluminum-based metal as the material of the core wire 11. A pair of terminals 13 are joined to two end portions of the core wires 11 through crimping, resistance welding, or the like.

A cross-sectional shape (i.e., a transverse cross-sectional shape) obtained by cutting the core wire 11 along a plane orthogonal to the length direction of the core wire 11 may be any shape. The transverse cross-sectional shape of the core wire 11 is a circular shape, a semicircular shape, a polygonal shape, a square shape, or a flat shape, for example. In this specification, "flat shape" includes rectangular, oval, and elliptical shapes, for example. Note that a "rectangular shape" in this specification has long sides and short sides, and does not include square shapes. Also, a "rectangular shape" in this specification include shapes obtained by chamfering a ridge portion and shapes obtained by rounding a ridge portion. The transverse cross-sectional shape of each core wire 11 in this example is a circular shape.

The insulating sheaths 12 are composed of an insulating material such as synthetic resin. The insulating sheaths 12 are provided over the entire length of the core wires 11 such that the two terminals 13 joined to the two end portions of the core wires 11 are exposed, and cover the entire outer circumferences of the core wires 11 with gaps between the insulating sheaths 12 and the core wires 11. That is, loose insulating sheaths 12 are applied such that the core wires 11 can expand and contract if the temperature thereof changes, for example. The insulating sheaths 12 correspond to one example of the insulating portion (insulation). A unit wire (wire member) is constituted by one core wire 11, one insulating sheath 12, and two terminals 13, and one conductive path 10 (conductive path 10A or conductive path 10B) is constituted by one or multiple unit wires. The conductive paths 10A and 10B of this example are each constituted by a single unit wire. Therefore, in this example, the two terminals 13 joined to the two end portions of the core wires 11 are connected to the inverter 3 or the high-voltage battery 4 via the connectors C1.

The protective tube 30 is formed as a single body as a result of a lower case and an upper cover being attached to each other, for example. In the protective tube 30, tubular spring members 20 (springs) are respectively attached to the conductive paths 10A and 10B, the spring members 20 being in contact with substantially the entire outer circumferential surfaces of the conductive paths 10A and 10B over substantially the entire length of the conductive paths 10A and 10B. The spring member 20 of this example has, as a single body, a spring main body 21 having an inner diameter that conforms to the outer diameter of the conductive paths 10A and 10B, and attachment portions 22 that extend in three rows of two end portions and an intermediate portion of the spring main body 21 over the entire length thereof. The spring members 20 are attached to the protective tube 30 by screws 23 at six positions in total, two positions in each row, via the attachment portions 22 in three rows. The spring main body 21 is provided with an opening 24 for introducing the conductive path 10A or the conductive path 10B over the entire length of the spring main body 21, and the conductive path 10A or the conductive path 10B is introduced from the opening 24 to resist the elastic force of the spring main body 21 being pressed against the spring main body 21.

Iron-based metals and copper-based metals can be used as the material of the spring member 20, for example. More specifically, stainless-steels can be used as the spring member 20, for example. Also, the spring members 20 of this example have elasticity to follow the expansion and contraction of the core wires 11 and eliminate the gaps between the core wires 11 and the insulating sheaths 12. That is, when the core wire 11 contracts, the spring member 20 (the spring main body 21) is brought into elastic contact with the outer circumferential surface of the corresponding insulating sheath 12, and the insulating sheath 12 is biased inward by the elastic force of the spring member 20 (the spring main body 21) to come into intimate contact with the core wire 11. On the other hand, when the core wire 11 expands, the spring member 20 (the spring main body 21) is brought into elastic contact with the outer circumferential surface of the corresponding insulating sheath 12, and the insulating sheath 12 is biased inward by the elastic force of the spring member 20 (the spring main body 21) to be brought into intimate contact with the core wire 11. At this time, the core wire 11 is brought into intimate contact with the insulating sheath 12 to resist the elastic force of the spring member 20 (the spring main body 21) due to the expansion thereof. In other words, the spring members 20 (the spring main bodies 21) have elasticity to eliminate the gaps between the core wires 11 and the insulating sheaths 12 while allowing the core wires 11 to expand and contract.

As described above, according to this embodiment, the following effects can be achieved.

(1) Because the protective tube 30 is provided with the spring members 20 that are in contact with the outer circumferential surfaces of the conductive paths 10A and 10B, the thermal resistance decreases as the contact area increases, and heat dissipation can be improved.

(2) Because the insulating sheaths 12 covering the outer circumferences of the core wires 11 of the conductive paths 10A and 10B are interposed between the conductive paths 10A and 10B and the spring members 20, it is possible to ensure the insulating properties of the wire harness 1.

(3) Loose insulating sheaths 12 are applied such that the core wires 11 can expand and contract, and the gaps between the core wires 11 and the insulating sheaths 12 are eliminated by the spring members 20, and thus, the extra length absorbing capability that the conductive paths 10A and 10B originally have can be exerted while improving heat dissipation.

(4) Because the spring members 20 are installed over substantially the entire length of the conductive paths 10A and 10B, heat dissipation can be more suitably improved.

(5) The conductive paths 10A and 10B can be easily attached simply by pressing the conductive paths 10A and 10B against the spring members 20.

Figure 4:
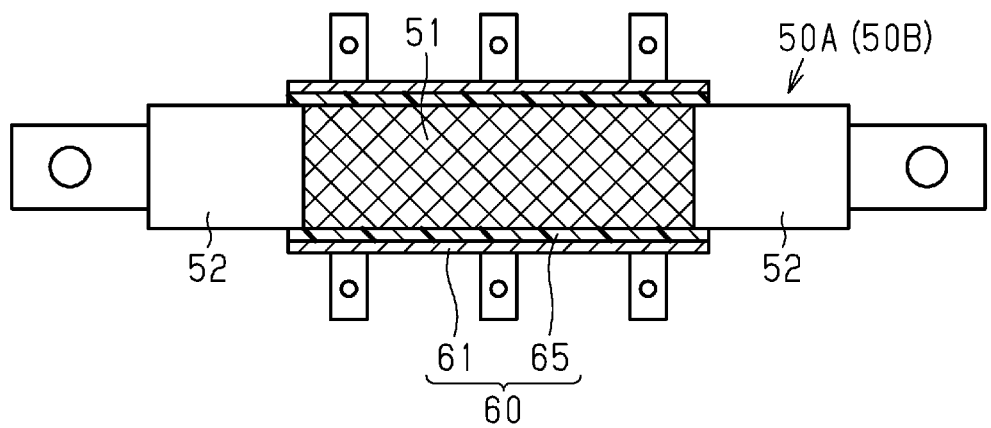
FIG. 4 is a partial cross-sectional view of a wire harness according to a modification example, showing a state in which an uncovered conductive path is introduced into a spring member.
Figure 5:
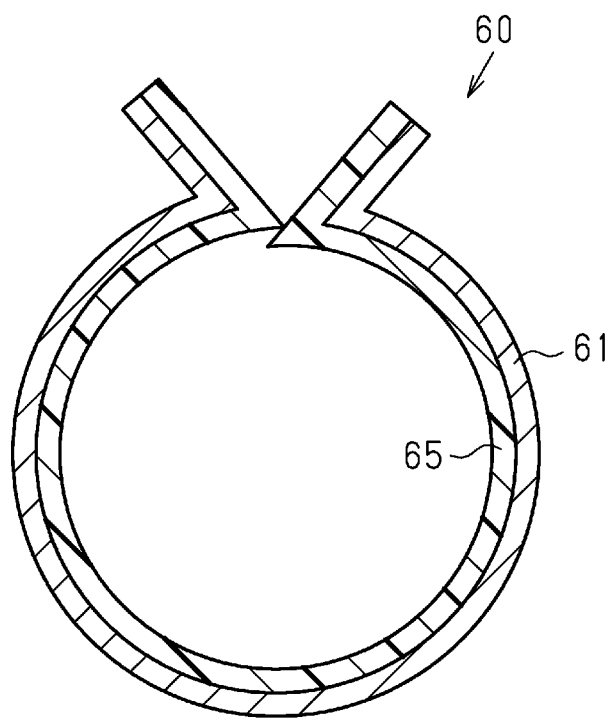
FIG. 5 is a cross-sectional view of the spring member into which the uncovered conductive path is introduced, with regard to the wire harness according to the modification example.

Note that the above-described embodiment can be modified as follows. The embodiment described above and the following modifications may be combined to the extent that they do not contradict each other technically. Although the covered conductive paths 10A and 10B in which the outer circumferences of the core wires 11 are respectively covered by the insulating sheaths 12 are used as wire members (wires) in the above-described embodiment, as shown in FIGS. 4 and 5, uncovered conductive paths 50A and 50B that do not have insulating sheaths on the outer circumferences of core wires 51 may be used. In this case, a braided conductor is used as the core wire 51, for example. Also, because uncovered wire members (the conductive paths 50A and 50B) are used, a spring member 60 in which an insulating coating 65 is applied to an inner surface of a spring main body 61 is used instead of the spring members 20 of the above-described embodiment. The insulating coating 65 corresponds to one example of the insulating portion.

In the example shown in FIG. 5, with regard to the spring member 60, two ends of the spring main body 61 may be closed in the natural state in which the spring main body 61 has not elastically deformed, and an opening 24 (see FIG. 2) for introducing a wire member, which may be the conductive path 50A, from outward in the radial direction, need not be formed between the two ends of the spring main body 61. When the spring main body 61 is elastically deformed, the opening 24 for introducing a wire member, which may be the conductive path 50A, from outward in the radial direction may be formed between the two ends of the spring main body 61.

The spring members 60 have elasticity to follow the expansion and contraction of the core wires 51 and cover the outer circumferences of the core wires 51 with the insulating coatings 65. That is, with the spring members 60, in order to secure the insulating properties of the uncovered wire members (the conductive paths 50A and 50B), the openings in the spring main bodies 61 are completely closed when the core wires 51 contract and when the core wires 51 expand, and each spring main body 61 (the insulating coating 65) is always in contact with substantially the entire outer circumferential surface of the corresponding core wire 51. Also, in the direction of the entire length of the core wire 51, two end portions, which are not covered by the spring member 60, are covered by insulating contractive tubes 52.

According to this configuration, the core wire 51 has high elasticity due to the uncovered wire members (the conductive paths 50A and 50B) being used, and thus the extra length absorbing capability that the conductive paths 50A and 50B originally have can be suitably exerted.

As shown in FIGS. 6(*a*) and 6(*b*), a heat dissipation member 70 (heat dissipater) that fills the gap between the spring member 20 and the protective tube 30 may be provided. An elastic body having high thermal stability, such as silicone rubber, can be used as the material of the heat dissipation member 70. According to this configuration, because the heat dissipation member 70 that fills the gap between the spring member 20 and the protective tube 30 is provided, heat is readily released from the spring member 20 to the outer cover member 30, and heat dissipation can be more suitably improved.

In the example shown in FIG. 6(*a*), the heat dissipation member 70 is provided so as not to interfere with the screws 23, and the heat dissipation member 70 can be attached later by silicone rubber or the like that is separate from the spring member 20, and the heat dissipation member 70 can also be molded as a single body, using the same metal as that of the spring member 20. In the example shown in FIG. 6(*b*), the heat dissipation member 70 is provided to interfere with the screws 23, the spring member 20 is fixed to the protective tube 30 using the screws 23, and the heat dissipation member 70 can then be attached later by silicone rubber or the like that is separate from the spring member 20. In both cases, the elasticity of the spring member 20 is secured to eliminate the gaps between the core wire 11 and the insulating sheath 12 while allowing the core wire 11 to expand and contract. Note that, of course, the spring member 60 (see FIG. 4) may be provided with the heat dissipation member 70, instead of the spring member 20.

Figure 7:
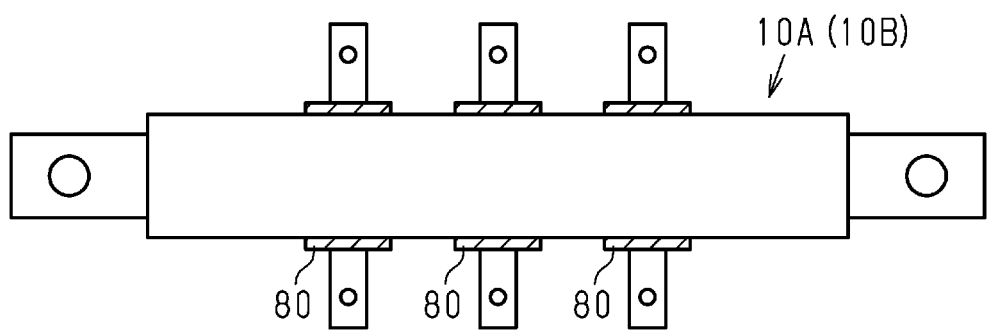
FIG. 7 is a partial cross-sectional view of a wire harness according to another modification example, showing a state in which a conductive path is introduced over a plurality of spring members.

Although a single spring member 20 is installed over substantially the entire length of each of the conductive paths 10A and 10B in the above-described embodiment, as shown in FIG. 7, spring members 80 may be respectively installed at the positions at which the wire harness is attached to the vehicle (referring to the positions of the clamps 40 in FIG. 1), for example. According to this configuration, because the spring members 80 are installed at the positions at which the wire harness is attached to the vehicle, heat is readily released from the spring members 80 to the vehicle body or the like through the protective tube 30, and heat dissipation can be more suitably improved. Note that, referring to FIG. 4, instead of installing a single spring member 60 over substantially the entire length of each of the conductive paths 50A and 50B, similarly to this modification example, multiple spring members may be respectively installed at the positions at which the wire harness is attached to the vehicle, for example.

Figure 6A:
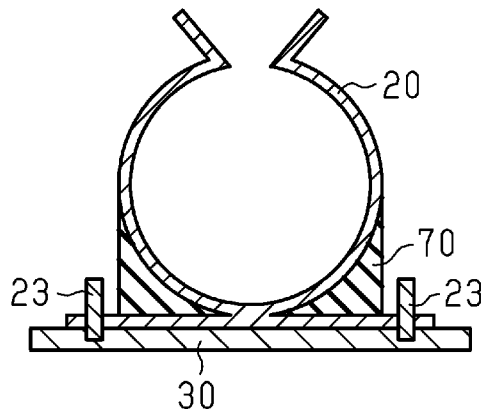
FIGS. 6(a) and 6(b) are cross-sectional views of spring members provided with heat dissipation members.
Figure 6B:
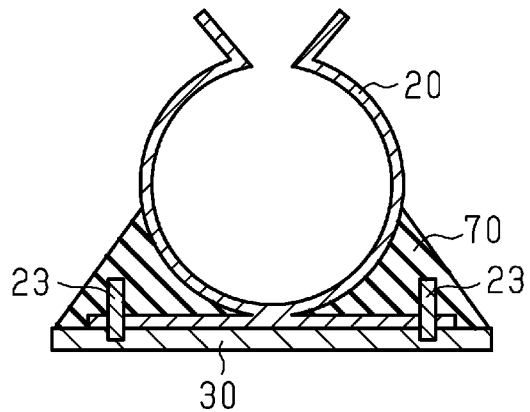

Variations such as the following can be adopted as the arrangement of the heat dissipation members 70 shown in FIGS. 6(a) and 6(b) in the longitudinal direction of the wire.

Figure 8A:
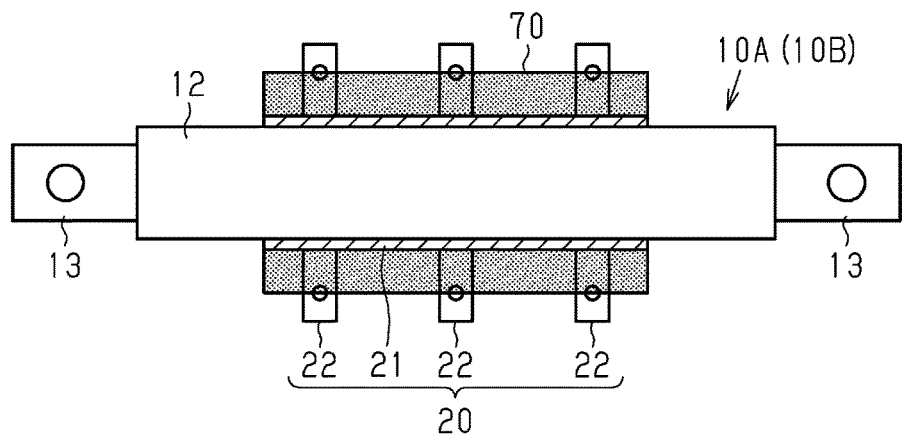
FIGS. 8(a) to 8(c) are partial cross-sectional views showing variations of the arrangement of the heat dissipation members in the longitudinal direction of the wire.

As shown in FIG. 8(a), the heat dissipation member 70 may be provided over the entire length of the spring member 20. According to this configuration, heat dissipation is particularly improved. Note that the heat dissipation members 70 are illustrated with a dotted pattern in FIG. 8(a) used in this modification example, and FIGS. 8(b), 8(c), 9(a), 9(b), 10(a), and 10(b) used in the following modification examples. Also, for the sake of description, the width of the dotted pattern (the heat dissipation member 70) extends to the vicinities of holes into which screws 23 for attachment portions 22 are inserted, showing that this modification example can be applied to the heat dissipation members 70 shown in FIGS. 6(a) and 6(b). Furthermore, the heat dissipation members 70 of the modification examples may be provided to the spring members 60 shown in FIG. 4 or the spring members 80 shown in FIG. 7, instead of the spring members 20.

Figure 8B:
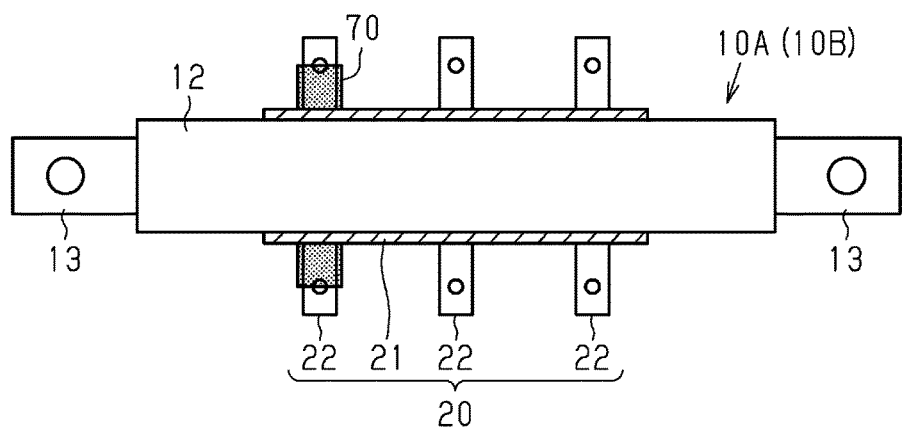

As shown in FIG. 8(b), the heat dissipation member 70 may be provided to cover only the attachment portion 22. According to this configuration, costs can be reduced due to usage of a portion of the wire in the longitudinal direction.

Figure 8C:
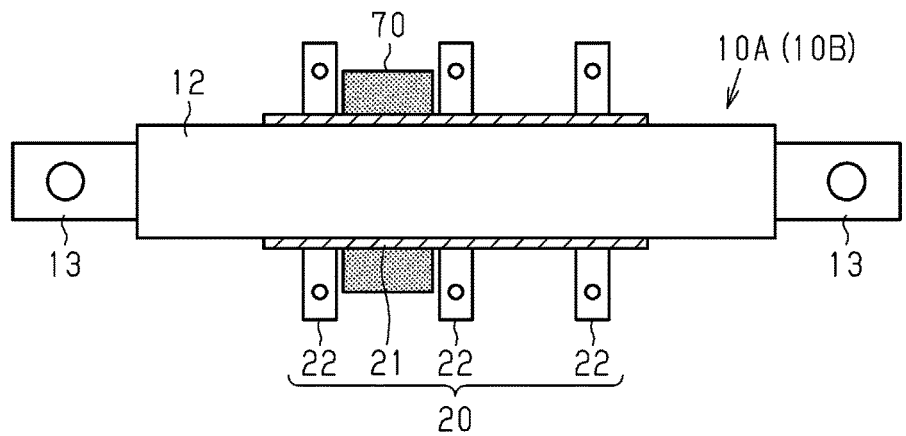

As shown in FIG. 8(c), the heat dissipation member 70 may be provided to avoid the attachment portions 22. According to this configuration, costs can be reduced due to usage of a portion of the wire in the longitudinal direction.

Figure 9A:
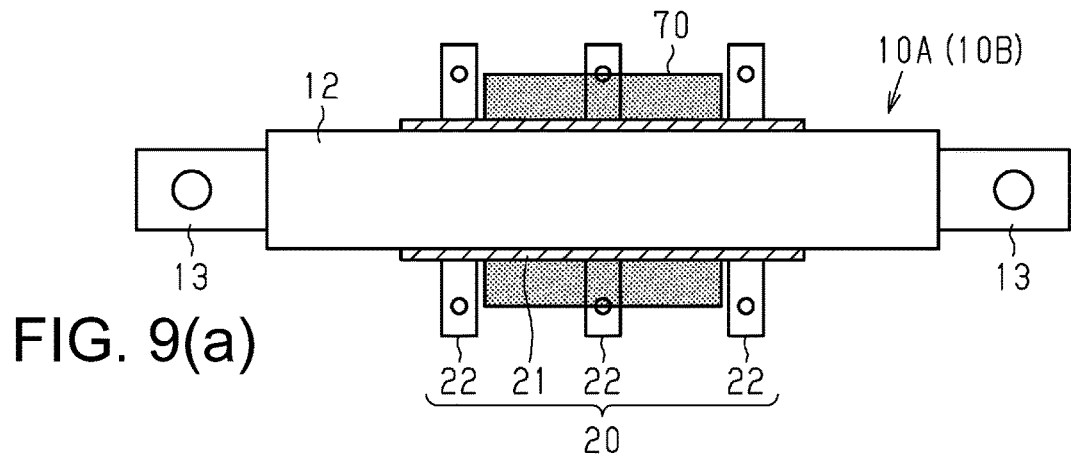
FIGS. 9(a) and 9(b) are partial cross-sectional views showing variations of the arrangement of the heat dissipation members in the longitudinal direction of the wire.

As shown in FIG. 9(a), one heat dissipation member 70 may be provided in a portion of the spring member 20 in the entire length thereof. According to this configuration, costs can be reduced due to usage of a portion of the wire in the longitudinal direction.

Figure 9B:
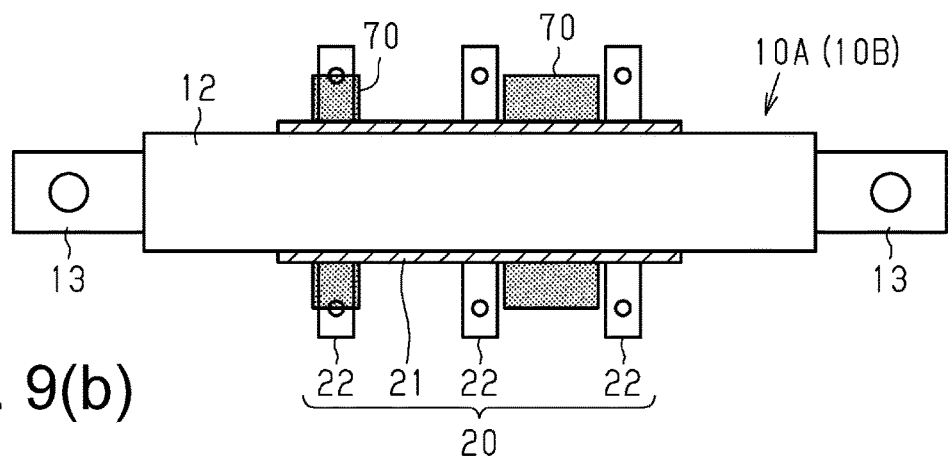

As shown in FIG. 9(b), multiple heat dissipation members 70 may be provided in portions of the spring member 20 that are not continuous in the entire length thereof. According to this configuration, costs can be reduced due to usage of a portion of the wire in the longitudinal direction.

Figure 10A:
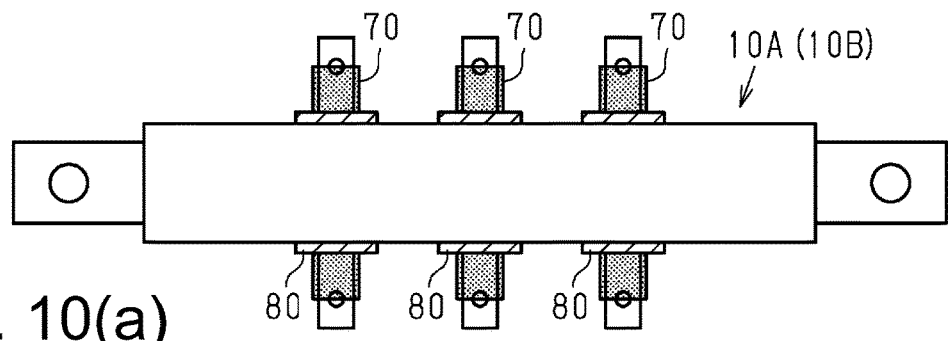
FIGS. 10(a) and 10(b) are partial cross-sectional views showing variations of the arrangement of the heat dissipation members in the longitudinal direction of the wire.

As shown in FIG. 10(a), if the spring members 80 are respectively installed at the positions at which the wire harness is attached to the vehicle, for example, the heat dissipation members 70 may be provided to all the multiple spring members 80.

Figure 10B:
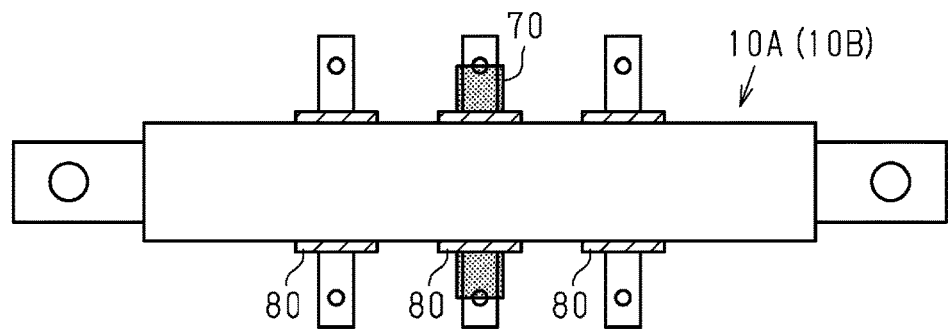

As shown in FIG. 10(b), if the spring members 80 are respectively installed at the positions at which the wire harness is attached to the vehicle, for example, the heat dissipation member 70 may be provided to at least one of the multiple spring members 80.

The heat dissipation members 70 may be provided in a manner in which modification examples are combined. Although spring members 20 are respectively prepared for the conductive paths 10A and 10B and the two spring members 20 are attached to the protective tube 30 in the above-described embodiment, with regard to the two conductive paths 10A and 10B, a single spring member may be attached to the protective tube 30, the spring member being formed as a single body through a portion where two spring main bodies that are respectively to be in contact with the outer circumferential surfaces of the conductive paths 10A and 10B are linked together. Note that, referring to FIG. 4, instead of the spring members 60 being respectively prepared for the conductive paths 50A and 50B and the two spring members 60 being attached to the protective tube 30, similarly to this modification example, a single spring member may be attached to the protective tube 30, the spring member being formed as a single body through a portion where multiple spring main bodies are linked together.

Although the inverter 3 and the high-voltage battery 4 are adopted as the electrical devices 2 connected by the wire harness 1 in the above-described embodiment, there are no limitations thereto. This disclosure may be adopted to a wire harness for connecting the inverter 3 and a wheel driving motor, for example. That is, this disclosure is applicable as long as a wire harness electrically connects two electric devices 2, or three or more electric devices 2 that are mounted on a vehicle. Note that this disclosure is not limited to wire harnesses and outer cover members for vehicles.

The present disclosure encompasses the following implementation examples. Not for limitation but for assistance in understanding, the reference numerals of the representative components in the representative embodiment are provided.

[Appendix 1] A wire harness (1) according to one or more implementation examples of this disclosure may include a wire member (10) having an outer circumferential surface;

an outer cover member (30) having an inner surface for defining an internal space into which the wire member (10) is inserted; and a clamp (20) disposed in the internal space of the outer cover member (30);

in which the clamp (20) may be configured to hold the wire member (10), and the clamp (20) may include a plate spring (21) that is in direct or thermally conductive contact with the outer circumferential surface of the wire member (10), and an attachment portion (22) that is attached to the inner surface of the outer cover member (30) and is in direct or thermally conductive contact with the inner surface of the outer cover member (30).

[Appendix 2] In one or more implementation examples of this disclosure, the attachment portion (22) of the clamp (20) may have a base surface that aligns with or is in surface contact with the inner surface of the outer cover member (30).

[Appendix 3] In one or more implementation examples of this disclosure, the plate spring (21) of the clamp (20) may be a curved plate spring that has a curved inner surface that aligns with or is in surface contact with the outer circumferential surface of the wire member (10) in a cross-sectional view orthogonal to an axis of the wire member (10).

[Appendix 4] In one or more implementation examples of this disclosure, the curved plate spring (21) of the clamp (20) may be in surface contact with the outer circumferential surface of the wire member (10) over the entire curved inner surface.

[Appendix 5] In one or more implementation examples of this disclosure, the plate spring (21) of the clamp (20) may be configured to elastically press the outer circumferential surface of the wire member (10).

[Appendix 6] In one or more implementation examples of this disclosure, the plate spring (21) of the clamp (20) may have a base end that is formed as a single body with the attachment portion (22) or that is fixedly supported by the attachment portion (22), and a free-end that is located opposite to the base end.

[Appendix 7] In one or more implementation examples of this disclosure, the plate spring (21) and the attachment portion (22) of the clamp (20) may be made of metal.

[Appendix 8] In one or more implementation examples of this disclosure, the outer cover member (30) may be a metal pipe.

[Appendix 9] In one or more implementation examples of this disclosure, the wire harness (1) may be configured to transmit heat generated in the wire member (10) due to a current flowing through the wire member (10) from the spring main body (21) to the attachment portion (22), and transmit heat from the attachment portion (22) to the inner surface of the outer cover member (30), and dissipate heat from an outer surface of the outer cover member (30) to the outside of the wire harness (1).

The invention claimed is:

1. A wire harness comprising:
a wire; and
an outer cover into which the wire is inserted; wherein:
the outer cover is provided with a spring that is in contact with an outer circumferential surface of the wire,
insulation covering an outer circumference of a core wire of the wire is interposed between the wire and the spring, and
the insulation is an insulating coating provided on an inner surface of the spring,
the wire is an uncovered wire that does not have an insulating sheath on the outer circumference of the core wire, and
the spring has elasticity to follow expansion and contraction of the core wire and cover the entire outer circumference of the core wire with the insulating coating.

2. A wire harness comprising:
a wire; and
an outer cover into which the wire is inserted;
wherein the outer cover is provided with a spring that is in contact with an outer circumferential surface of the wire, and
wherein the wire harness is provided with a heat dissipater that fills a gap between the spring and the outer cover.

* * * * *